June 14, 1932.  J. BRIENZA  1,863,236
SHOULDER MEASURING INSTRUMENT
Filed Jan. 13, 1930

JOSEPH BRIENZA
INVENTOR

BY John Elias Jones
ATTORNEY

Patented June 14, 1932

1,863,236

UNITED STATES PATENT OFFICE

JOSEPH BRIENZA, OF CINCINNATI, OHIO

SHOULDER MEASURING INSTRUMENT

Application filed January 13, 1930. Serial No. 420,527.

This invention relates to tailors' measuring sticks or the like for accurately and reliably detecting the presence and degree or proportion of depth of low shoulders in the designing, cutting and fitting of wearing apparel so as to facilitate the perfect fitting of the garment upon the shoulders of the person so as to properly hang therefrom.

The device herein consists of a very simple and economical one that is easily made and handled, will not easily get out of order or out of "true", and that is not complicated so as to mystify or confuse the beginner or user, or otherwise require unusual skill to manipulate it. The details of structure and their relative mode of application or operation will be fully considered and duly pointed out in the following description of the accompanying sheet of drawing, in which—

Figure 1:
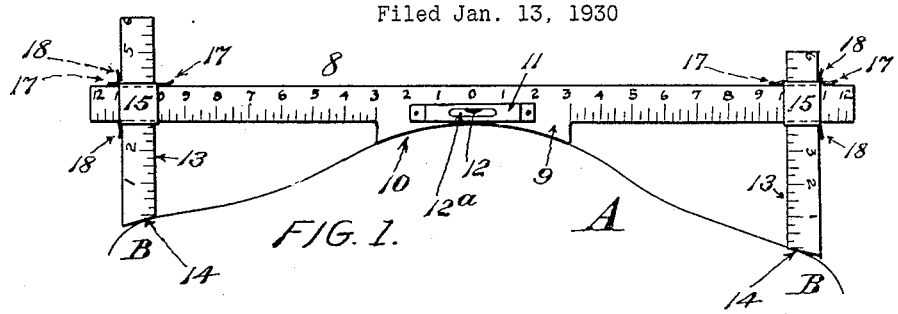
Figure 2:
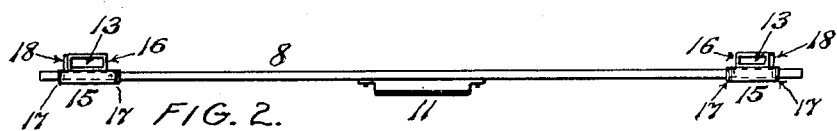
Figures 3, 4:
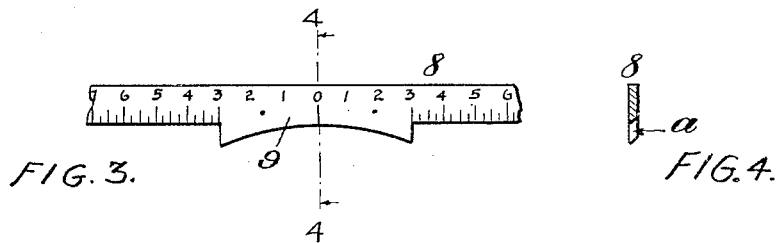
Figures 5, 6, 7:
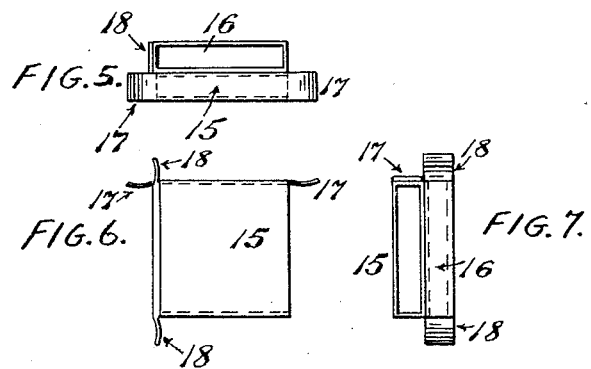

Figure 1 is a front elevation of the instrument, showing it in position on the shoulders of a person; Fig. 2, a plan view of said device, taken by itself; Fig. 3, a fragmentary front elevation, similar to Fig. 1, but of the middle portion of the device only and omitting the spirit-level; Fig. 4, a cross-section taken on the vertical dotted-line 4, 4, of Fig. 3; Fig. 5, a plan view of the "duplex" tubular coupling-member adapted to both the horizontal and vertical sliding of the upright shoulder-depth measuring-scale at each end of the master-beam of the implement; Fig. 6, a front elevation of the "duplex" coupling-member seen in Fig. 5; and Fig. 7, a right-end view of the "duplex" coupling part seen in Fig. 6.

A indicates an outline or upper contour of the ordinary shoulders of a person, the same including the central curved or arch portion 10 at the neck of the person and the tips or rounded points B, B, at the opposite ends of the shoulders, such outline forming the basis of operations in the use of my measuring-implement herein, and subject to considerable vertical variation in the pairs of shoulders in the make-up of human beings generally.

8 indicates the master-beam or body-portion of the implement that is adapted to carefully and accurately carry out the object of my invention herein. This beam is provided along the lower edge of its front face with graduated spaces numbering, in fractionally-divided inches, a corresponding ascending scale from both sides of the middle or center of the beam, where the pair of scales begins with a common zero, as best noted in both Figs. 1 and 3. The respective numerals of the pair of oppositely directed or arranged scales appear in a straight line across the upper edge of said face of the beam, and duly register with the respective enumerated inch-markings for the convenience of the user of the instrument when measuring the shoulders and positively detecting or determining the lower one of the two, including the exact scope or extent of deviation. In order that the said beam may properly rest or seat on the back of the person being measured, I provide a concave downward extension 9 at the center of the beam, such extension being of a suitable width or transverse scope to cover the arch-portion 10 at the base of the neck of said person, and any suitable spirit-level or level-indicator 11 is attached by screws or the like on the broad part of the said part 9 in approximate horizontal alignment with the lower edge of the beam so that the bubble 12 of the level shall balance or come to rest in the sight 12ª at the middle of the latter, as customary, when the beam is in true horizontal level position on said arch-portion 10 and with the opposite, graduated ends of the beam in a true level line above the pair of shoulders, and firmly and evenly held so, on said arch 10, by the measurer, ready now for the use of the vertical measuring end-members 13, 13, that duly correspond with each other and are ordinarily of six inches depth, as indicated by the ascending scales or numbered graduations on the front face of each, also handy for the said measurer. The lower ends or extremities of said end scale-members 13 are sloped, as shown at 14, so as to conform to the rounding contour or slope of the shoulders, especially as shown at the points B, B, of the latter, and rest comfortably and steadily thereon during the measuring operation.

In order to properly mount the said pair of measuring end-members 13, 13, on the beam, I provide each one of the pair with a two-way or what might be ordinarily or incidentally called a "duplex" coupling-box that has a horizontal chamber or passageway 15 along one side thereof and a vertical chamber or passageway 16 along its other side, or, in other words, said chambers or passageways are at right-angles to each other in each coupling-box that is adapted to support its measuring end-member 13 in both a horizontal and vertical adjustably-slidable position on said beam, thereby allowing for the different widths of shoulders as well as variations in the depths or slopes of said shoulders in relation to the duly leveled beam when measuring the person for the correct, easy designing and proper fitting of the garment and, more especially, at and along the shoulders thereof.

In order, also, to easily adjust or conform the lower extension 9 to its resting-place on the arch-portion 10 at the middle of the shoulders, I bevel the inner edge of the lower curved edge of said extension 9, as best shown at a in the detail section, Fig. 4.

In order, also, to properly sustain the said measuring end-members 13, 13, in their desired relation on the beam, I provide the said coupling-box of each with frictional spring-arms, a pair 17, 17, extending horizontally from the opposite ends of the tops of the member 15 of each coupling-box so as to frictionally-rest on the upper edge of the beam, and, also, a pair 18, 18, extending vertically from the outer vertical edges of the member 16 of each coupling-box, as distinctly shown in the views, 5, 6 and 7, at the foot of the drawing herein, and, also, in Figs. 1 and 2, wherein the beam is included.

It will be seen, in Figs. 1 and 2, and especially in Fig. 2, that the said measuring end-members 13, 13, are located in the members 16 of the coupling-boxes so as to be on the back of the beam and thus not in the way of the measurer at the front of said beam when he wishes to duly adjust the beam in leveled measuring-place on the shoulders of the person being measured for a garment.

In said Fig. 1, it will be readily seen that the left-hand measuring end-member 13 is adjusted to a much higher level above that of the right-hand measuring end-member 13, thus quickly and reliably indicating that the latter is the low shoulder, and, at the same time, showing the exact amount of "dip" or deflection, so that the measurer can immediately record same on his memoranda slip or chart preparatory to making up his design or pattern for use in cutting out the goods in an accurate and satisfactory, true manner to suit the exact contour of the shoulders of the person for whom the clothes are to be made and with due allowance for his "low" shoulder if there be any in his frame, and there usually is.

It will be seen that the device can be easily and cheaply made, as well as taken apart for packing and repairs, or replacing of defective or worn, mutilated parts, and just as easily assembled, ready for use. Owing to its great simplicity its use is very easily learned and accomplished or mastered, and mistakes or errors, in such use, well avoided.

I claim:—

1. A shoulder measuring instrument adapted to indicate the relative height of the respective shoulders of a person under measurement comprising, a beam adapted to be supported centrally upon the shoulders of the person under measurement, in a horizontal position and having scales upon opposite sides of the center thereof, and transverse members each provided with a scale, said transverse members being each slidably adjustable along said beam to points above the ends of the shoulders and transversely of said beam to contact with the ends of the shoulders, and to indicate the respective distances between the shoulders and the beam.

2. A shoulder measuring instrument comprising a beam bearing a measuring scale and having a central extension adapted to rest upon the central part of the shoulder, a spirit level mounted upon the central part of the beam, a scale bearing end-member at each end of the beam and a coupling-box mounted slidably at each end of the beam and having a passage slidably engaging an end-member, whereby to permit vertical adjustment of the end-members relatively to the beam.

3. A shoulder measuring instrument adapted to register the relative height of the respective shoulders of a person under measurement comprising, a horizontal beam having a concave centrally located supporting member and scales at opposite sides thereof, means to indicate when said beam is in a horizontal position, transverse members each provided with a scale, said transverse members being respectively mounted one upon each end of said beam and each slidably adjustable along said beam and transversely of said beam to register the position of the respective shoulders relative to said beam.

In testimony whereof I hereunto affix my signature.

JOSEPH BRIENZA.